United States Patent Office 3,316,036
Patented Apr. 25, 1967

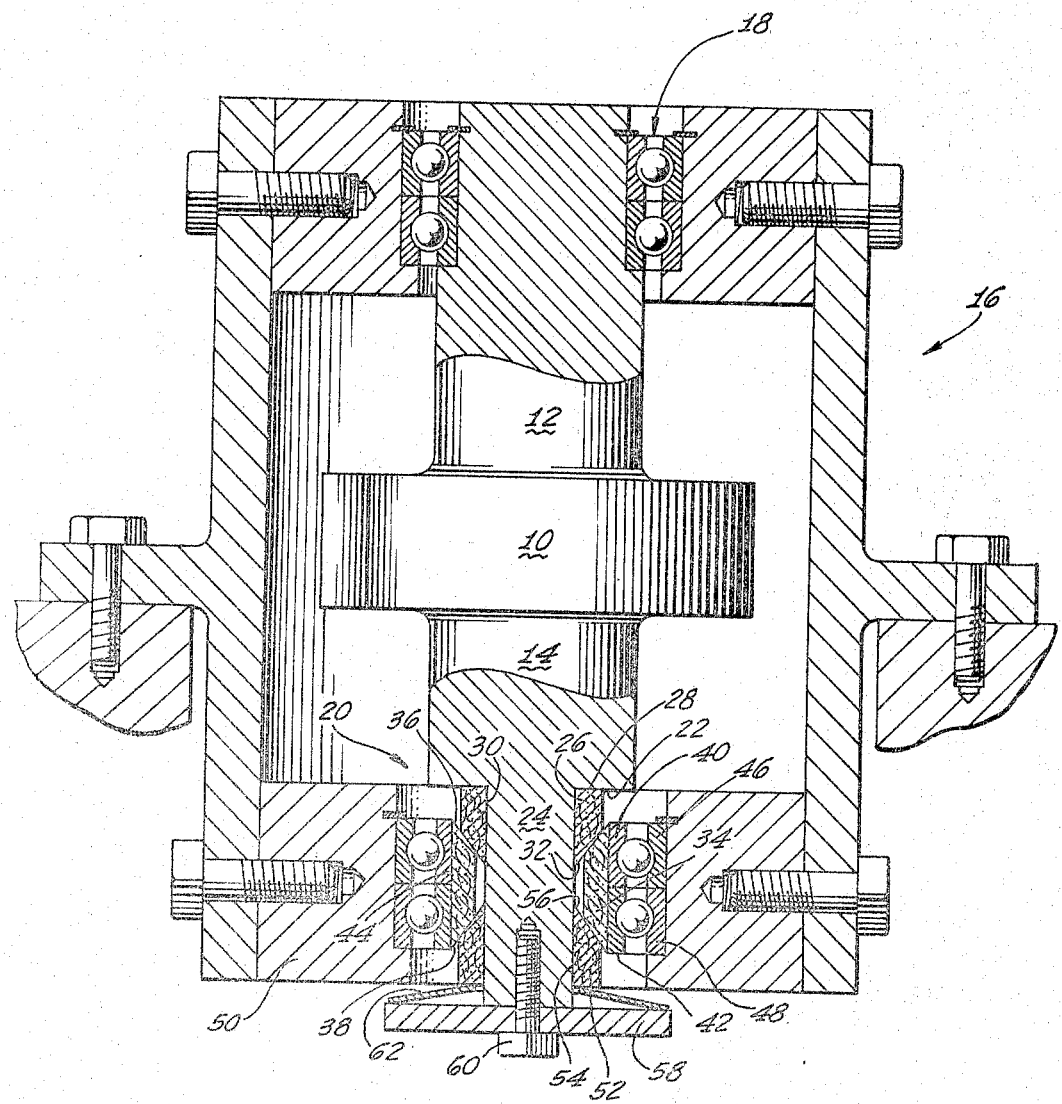

3,316,036
DAMPED BEARING
Erling J. Bligard, Woodland Hills, Alfred H. Colton, Jr., Encino, and Howard G. Thrasher, Tarzana, Calif., assignors to Litton Systems, Inc., Beverly Hills, Calif.
Filed Dec. 11, 1964, Ser. No. 417,543
14 Claims. (Cl. 308—184)

This invention pertains to a bearing, and more particularly to a damped bearing which is adapted to be used between gimbals in a Cardan type suspension.

When precision gyroscopes, accelerometers, and the like are supported by gimbals, it is important that axial and radial play be minimized and that vibration transmitted across the bearings be damped. Further, it is important to allow relative axial displacement of the gimbals under conditions of differential thermal expansion.

It is desirable that a damped bearing not only damp the vibration transmitted across the bearing, but also have a minimum of radial and axial play and be self aligning.

To the end of solving the above problems, and also taking up the slack in the bearing, the bearing of this invention uses conically shaped surfaces which are forced into contact by a spring such as a Belleville spring or washer. The force of the Belleville spring is cammed by the conical surfaces to force two surfaces into contact to damp vibrations transmitted through the bearing.

It is therefore an object of the invention to damp vibrations transmitted through a bearing, and more particularly through a bearing between two gimbals.

It is another object of this invention to damp a bearing while removing radial and axial play and while enhancing alignment of the bearing.

It is a more particular object of this invention to provide a bearing and apparatus to achieve the above enumerated objects.

Other objects will become apparent from the following description, taken in connection with the accompanied drawings, in which the only figure is a view, partially in profile and partially in section, of a preferred embodiment of this invention.

Referring to the figure, an inner mass or gimbal 10 is supported upon two shafts 12 and 14 which, in turn, are supported relative to an outer frame or gimbal 16 upon two pairs of bearings 18 and 20. The bearing 20 is a typical bearing of this invention including the damping features and features which are adapted to reduce both radial and axial play in the bearings.

In the embodiment, the shaft 14 has a shoulder 22 and a shaft of reduced diameter 24.

A first collar 26, is placed over shaft 24 against shoulder 22. Alternatively, collar 26 could be cemented (not shown) to shaft 24. Collar 26 could also be an integral part of shaft 24. With a shoulder 22, the collar 26 has a flat surface 28 on one end to seat firmly against shoulder 22. The circularly cylindrical surface 30 of collar 26 seats firmly against shaft 24 in a sliding fit. On the second end of collar 26, surface 32 is convex and conical.

A second collar 34 of high friction material has an inner diameter which is greater than the inner diameter of collar 26 and less than the outer diameter of collar 26. One end 36 of collar 34 is concave and conically shaped with the apex angle of surface 36 substantially the same as the apex angle of surface 32. The second end 38 of collar 34 is also concave and conically shaped.

A third collar 52 has a circularly cylindrical inner surface 54 which forms a sliding fit over shaft 24. The end 56 of collar 52, which is adjacent collar 34, is convex and conically shaped with an apex angle substantially the same as the apex angle of the surface 38.

Typical materials for members 26, 34, and 52 are metals, felt, plastics, asbestos, fiberboard products, and the like. Thus, the coefficient of friction may be chosen as desired.

A washer or shoulder 58 is attached, for example, by a bolt 60 to shaft 24.

Between shoulder or washer 58 and collar 52 is a Belleville spring 62, positioned around shaft 24, and contacting collar 52 to urge surface 56 into contact with surface 38 and to urge surface 36 into contact with surface 32, thereby taking up end play in the bearing 20 and causing collar 34 to be biased radially outward and centered to be substantially coaxial with shaft 24.

The inner races 40 and 42 form a sliding contact with substantially right circularly cylindrical surface 44 of collar 34. Collar 34 is biased into contact with the surface of races 40 and 42 by the camming action of surfaces 32 and 56 under the urge of spring 62. The surface 44 of collar 34 exerts friction in an axial direction on the inner surfaces of races 40 and 42, thereby friction damping the transmission of axial vibrations. It should be noted that if a damping fluid (not shown) is placed on the surface 44, viscous damping rather than friction damping occurs. Therefore, 44 will merely be called a damping surface.

The outer races 46 and 48 of the ball bearings are fastened to the gimbal structure 50 of the outer gimbal 16.

The ball bearing pairs in bearings 18 and 20 are each preloaded. It is to be noted that the friction or viscous damping at surface 44 does not affect the preloading of the bearings.

Thus, axial vibrations are damped at damping surface 44, bearing races 40 and 42 are centered to be substantially coaxial with the axis of shaft 24, and end play is taken up by Belleville spring 62.

Although the invention has been described in detail above, it is not intended that the invention should be limited by the description but only in accordance with the spirit and scope of the appended claims.

What is claimed is:
1. In combination:
   a shaft;
   a first collar, restrained against at least axial and radial motion relative to said shaft, having a convex conical surface on one end thereof;
   a second collar having an inner diameter greater than the inner diameter and less than the outer diameter of said first collar, having a circularly cylindrical damping surface with a predetermined coefficient of friction on the outer periphery thereof, and having concave conical surfaces on the ends thereof, the said conical surface on a first said end having an apex angle substantially the same as the apex angle of said conical surface of said first collar;
   a third collar having a sliding fit on such shaft and restrained against radial motion relative to said shaft including a convex conical end surface having an apex angle substantially the same as the apex angle of said second conical surface on said second collar; said collars being positioned on said shaft to cause the first conical surface of said second collar to mate said conical surface on said first collar and to cause said conical surface on said third collar to mate said second conical surface on said second collar;
   a Belleville spring engaging said third collar and said shaft for forcing said third collar into engagement with said second collar and said second collar into engagement with said first collar to center said second collar and to force said second collar to deflect in a radial direction; and
   means forming a substantially circularly cylindrical sur- face substantially enclosing and frictionally engaging said damping surface while allowing relative motion between said enclosing and said damping surface.

2. A device as recited in claim 1 in which said last named enclosing surface means is the inner race of a ball bearing set.

3. A device as recited in claim 2 in which the outer race of said ball bearing set is attached to a gimbal.

4. In combination:
an outer bearing race;
an inner bearing race;
a plurality of bearing balls positioned between said races;
means forming a circularly cylindrical damping surface slidingly engaging said inner bearing race;
a spring, directing its force in a direction coaxial with said bearing races; and
a pair of conical cams contacting said spring to receive force therefrom and to redirect said force into a radial direction to cause said damping surface frictionally and slidingly to engage said inner bearing race and to apply a radial force between said damping surface and said inner race, said force being of a controlled amplitude to allow relative motion between said damping surface and said inner race while absorbing energy due to said relative motion to damp the transmission of forces between said damping surface and said inner race.

5. A device as recited in claim 4 in which said spring means is a Belleville spring, adapted and positioned to apply force to said cams.

6. In combination:
a shaft;
first and second washers having a sliding fit on said shaft, said first washer being constrained both axially and radially, said second washer being constrained radially, the adjacent ends of said washers being convex and conically shaped;
a third collar having an inner diameter greater than an inner diameter of said first and second collars and having concave conically shaped surfaces on both ends, the apex angles of said conically shaped surfaces being the same as the apex angles of said conically shaped surfaces on said first and second collars, said third collar being positioned on said shaft between said first and second collars with said conical surfaces in contact;
a Belleville spring washer, positioned on said shaft to apply axial force between said shaft and said second collar to force said conical surfaces into engagement, to center said third collar, and to cam said force radially outward through said conical surfaces against the outer surface of said second collar; and
means forming a substantially circularly cylindrical surface frictionally and slidingly engaging the outer surface of said third collar, whereby force of said Belleville spring forces the outer surface of said third collar into frictional and sliding engagement with said last named surface to absorb energy due to relative movement between said third collar and said last named surface.

7. In combination:
a gimbal;
a shaft attached to said gimbal and having a shoulder thereon;
a first right circularly cylindrical collar having an inner diameter substantially equal to the outer diameter of the smaller portion of said shaft, positioned upon said smaller portion and abutting against said shoulder, the non-abutting end of said collar having a convex conical shape;
a second circularly cylindrical collar having inner and outer diameters which are, respectively, greater than the inner and outer diameters of said first collar and having concave conical contours at both ends, the contour of one end mating with the said conical contour of said first collar;
a third circularly cylindrical collar having a convex conical contour on one end adapted to mate with the second conical contour on said second collar and having inner and outer diameters which are less than the inner and outer diameters, respectively, of said second collar;
a Belleville spring forcing said third collar into engagement with said second collar and said second collar into engagement with said first collar;
means on said shaft against which said Belleville spring is anchored; and
means forming a substantially circularly cylindrical surface frictionally and slidingly engaging the outer surface of said second collar and adapted to absorb energy due to motion between said last named surface and said second collar.

8. A device as recited in claim 7 in which said last named surface is the inner surface of a ball bearing race.

9. A device as recited in claim 8 in which said gimbal is attached to said shaft and further comprising a second gimbal attached to the outer ball bearing races of said last named ball bearings.

10. A device as recited in claim 9 in which said last named ball bearings are a preloaded ball bearing pair.

11. A device as recited in the claim 10 and further comprising a second ball bearing pair between said first and second gimbals and in which said Belleville spring exerts a substantially constant force while it takes up axial and radial play between said gimbals.

12. A cylindrical damper comprising:
outer and inner means forming a pair of sliding cylindrical frictional surfaces, said inner means forming a cylindrical surface being a resilient ring;
camming means, at least a portion of which is integral with said inner means; and means for applying a substantially constant radial force to said inner means and between said surfaces, said force being of a controlled amplitude to allow relative sliding motion between said inner and outer means, but of sufficient amplitude to absorb energy due to said relative motion.

13. A device as recited in claim 12 and further comprising a bearing, of which said outer means is an inner race of said bearing.

14. A device as recited in claim 13 and further comprising two relatively rotatable members, one of which is attached to said camming means and the other of which is attached to an outer bearing race of said bearing.

References Cited by the Examiner

UNITED STATES PATENTS

| | | | |
|---|---|---|---|
| 1,427,392 | 8/1922 | Jones | 308—64 |
| 1,980,123 | 11/1934 | Weber | 308—35 |
| 2,054,228 | 9/1936 | Oelkers et al. | 308—35 |
| 2,338,470 | 1/1944 | Uraquhart et al. | 308—189 |
| 2,573,928 | 1/1951 | Peter | 287—53 |
| 2,581,656 | 1/1952 | Horless | 308—184 |
| 2,649,808 | 8/1953 | Slater et al. | 74—5 |

FOREIGN PATENTS

| | | |
|---|---|---|
| 317,314 | 3/1930 | Great Britain. |
| 336,639 | 10/1930 | Great Britain. |
| 400,260 | 10/1933 | Great Britain. |
| 849,691 | 8/1939 | France. |
| 43,243 | 4/1914 | Sweden. |

MARTIN P. SCHWADRON, *Primary Examiner.*

FRANK SUSKO, *Examiner.*